US011980893B2

(12) United States Patent
Coray

(10) Patent No.: US 11,980,893 B2
(45) Date of Patent: May 14, 2024

(54) RELATING TO GRINDING MILLS

(71) Applicant: Dale Coray, British Columbia (CA)

(72) Inventor: Dale Coray, British Columbia (CA)

(73) Assignee: Dale Coray, British Columbia (CA)

( * ) Notice: Subject to any disclaimer, the term of this patent is extended or adjusted under 35 U.S.C. 154(b) by 299 days.

(21) Appl. No.: 17/631,652

(22) PCT Filed: Jun. 23, 2020

(86) PCT No.: PCT/IB2020/055889
§ 371 (c)(1),
(2) Date: Jan. 31, 2022

(87) PCT Pub. No.: WO2021/028736
PCT Pub. Date: Feb. 18, 2021

(65) Prior Publication Data

US 2022/0274118 A1 Sep. 1, 2022

(30) Foreign Application Priority Data

Aug. 12, 2019 (AU) ................................ 2019902888

(51) Int. Cl.
*B02C 17/22* (2006.01)

(52) U.S. Cl.
CPC .................................... *B02C 17/22* (2013.01)

(58) Field of Classification Search
CPC .............................. B02C 17/22; B02C 17/225
USPC .............................. 241/182, 183, 299, 101.2
See application file for complete search history.

(56) References Cited

U.S. PATENT DOCUMENTS

| | | | | |
|---|---|---|---|---|
| 4,135,852 | A | 1/1979 | Archibald | |
| 8,453,956 | B2 | 6/2013 | Coray | |
| 2018/0257082 | A1* | 9/2018 | Canabes Guerra | ..... B02C 17/04 |

FOREIGN PATENT DOCUMENTS

| | | | | |
|---|---|---|---|---|
| CA | 2764712 | A1 | 12/2010 | |
| EP | 3156130 | A1 * | 4/2017 | ............. B02C 17/04 |
| GB | 834007 | | 5/1960 | |
| WO | WO-2008124867 | A1 * | 10/2008 | ............. B02C 17/18 |

OTHER PUBLICATIONS

A International Search Report and Written Opinion issued in International Application No. PCT/IB2020/055889; dated Nov. 9, 2020.

* cited by examiner

*Primary Examiner* — Bobby Yeonjin Kim
(74) *Attorney, Agent, or Firm* — Pearne & Gordon LLP

(57) ABSTRACT

A liner segment (10) for a rotary ore grinding mill (1) is disclosed. The mill has a horizontal mill axis (25), and an interior having a cylindrical liner (6) with a frusto-conical end (8) from which ground ore slurry exits the mill. Each segment includes a part collar (12) which protrudes inwardly into the interior. The collar has a first generally cylindrical surface (13) co-axial with the mill axis and a second flange surface forming a substantially annular flange (14) of greater radius than the cylindrical surface, surrounding an interior end of the cylindrical surface, and being connected to the cylindrical surface. Each segment has a vane (21) extending radially outwardly of the first cylindrical surface and projecting into the interior. The vane impedes the exit from said mill of unground ore particles and grinding media, and permits the exit of the slurry. A method is also disclosed.

12 Claims, 7 Drawing Sheets

RELATING TO GRINDING MILLS

FIELD OF THE INVENTION

The present invention relates to grinding mills which are used to reduce the size of mineral ores from large pieces to fine particles suspended in a slurry. Such mills include Sag, Ag, Ball and Rod mills.

BACKGROUND ART

In particular, the present invention relates to an improvement in, or modification to, the invention disclosed in U.S. Pat. No. 8,453,956 issued to the present applicant.

A typical such mill has a hollow cylindrical body which is rotatable about a horizontal axis. The interior of the body is lined with a substantially cylindrical liner which has frusto-conical ends. The liner is formed by a number of segments which go together to form the cylindrical shape. Each frusto-conical end has a central opening. One such opening functions as an entry point for ore and the other opening functions as an exit point for ground ore particles suspended in a slurry. Within the interior of the mill are located grinding media, typically steel balls or other such objects.

The ore and water fed into the mill are mixed with the grinding media as the body of the mill is rotated. The grinding media impact the boulder sized pieces of ore which are ground to a fine powder which is suspended in a slurry formed from the ore particles and water fed into the mill. The slurry exits from the exit point, however, this slurry typically contains larger ore particles and balls or other objects of the grinding media.

Accordingly, it is necessary to separate the larger ore particles and the grinding media and return these to the entry point of the mill. This requires various sieves, trommels or the like, and often includes a magnetic separation system, all of which make up the overall slurry return system. The slurry return system is expensive to construct and operate.

The above-mentioned US patent is concerned about the entry point of such a mill and, in particular, the ease with which the feed chute can be dismantled from the entry point of the mill in order to permit the liner within the body of the mill to the replaced. A frusto-conical liner end was disclosed in which the feed chute did not come into contact with the frusto-conical liner end. Specifically, a frusto-conical liner end with a collar including an annular flange was disclosed.

Genesis of the Invention

The Genesis of the present invention is a desire to improve upon this arrangement.

SUMMARY OF THE INVENTION

In accordance with a first aspect of the present invention there is disclosed a liner segment for a rotary mineral ore grinding mill having a generally horizontal mill axis, and an interior having a generally cylindrical liner with a frusto-conical end constituting an exit for ground ore slurry formed in said mill, said segment comprising one of a plurality of substantially identical segments making up said liner frusto-conical end, and each of said segments including a part of a collar which protrudes inwardly into said mill interior and has a first generally cylindrical surface co-axial with said mill axis and a second flange surface forming a substantially annular flange of greater radius than said first surface, surrounding an inner end of said cylindrical surface, and being connected thereto, and said segment having a vane located thereon extending radially outwardly of said part first cylindrical surface and projecting into the interior of said mill, said vane impeding the exit from said mill of unground ore particles and grinding media and permitting the exit of said slurry.

Preferably the vane is substantially planar.

Preferably the vane lies substantially in a first plane making an acute angle with a second plane which is radial to the mill axis.

Preferably the acute angle is between 0° and 45°.

Preferably the acute angle is approximately 22°.

There is also disclosed a mill liner having a substantially cylindrical body and two frusto-conical ends, one of the ends being an entry end and the other of the ends being an exit end, the exit end having a plurality of liner segments as defined above.

Preferably the mill liner entry end is a mirror image of the exit end.

According to another aspect of the present invention there is provided a method of operating a rotary mineral ore grinding mill having a horizontal mill axis, and a generally cylindrical interior with lined with a generally cylindrical liner having substantially frusto-conical liner ends, one of which constitutes an entry end and one of which constitutes an exit end, said method comprising the step of operating said mill without any slurry return path from said exit end to said entry end.

Preferably the substantially frusto-conical liner exit end is formed from a plurality of segments, each of said segments including a part of a collar which protrudes inwardly into said mill interior and has a first generally cylindrical surface co-axial with said mill axis and a second flange surface forming a substantially annular flange of greater radius than said first surface, surrounding an inner end of said cylindrical surface, and being connected thereto, and each said exit end segment having a vane located thereon radially outwardly of said part first cylindrical surface and projecting into the interior of said mill, said vanes impeding the exit from said mill of unground ore particles and grinding media and permitting the exit of said slurry.

Preferably the vane is substantially planar.

Preferably the vane lies in a first plane making an acute angle with a second plane which is radial to the mill axis.

Preferably the acute angle is between 0° and 45°.

Preferably the acute angle is approximately 22°.

BRIEF DESCRIPTION OF THE DRAWINGS

Two embodiments of the present invention will now be described, by way of example only, with reference to the accompanying drawings in which.

DETAILED DESCRIPTION

Figure 1:
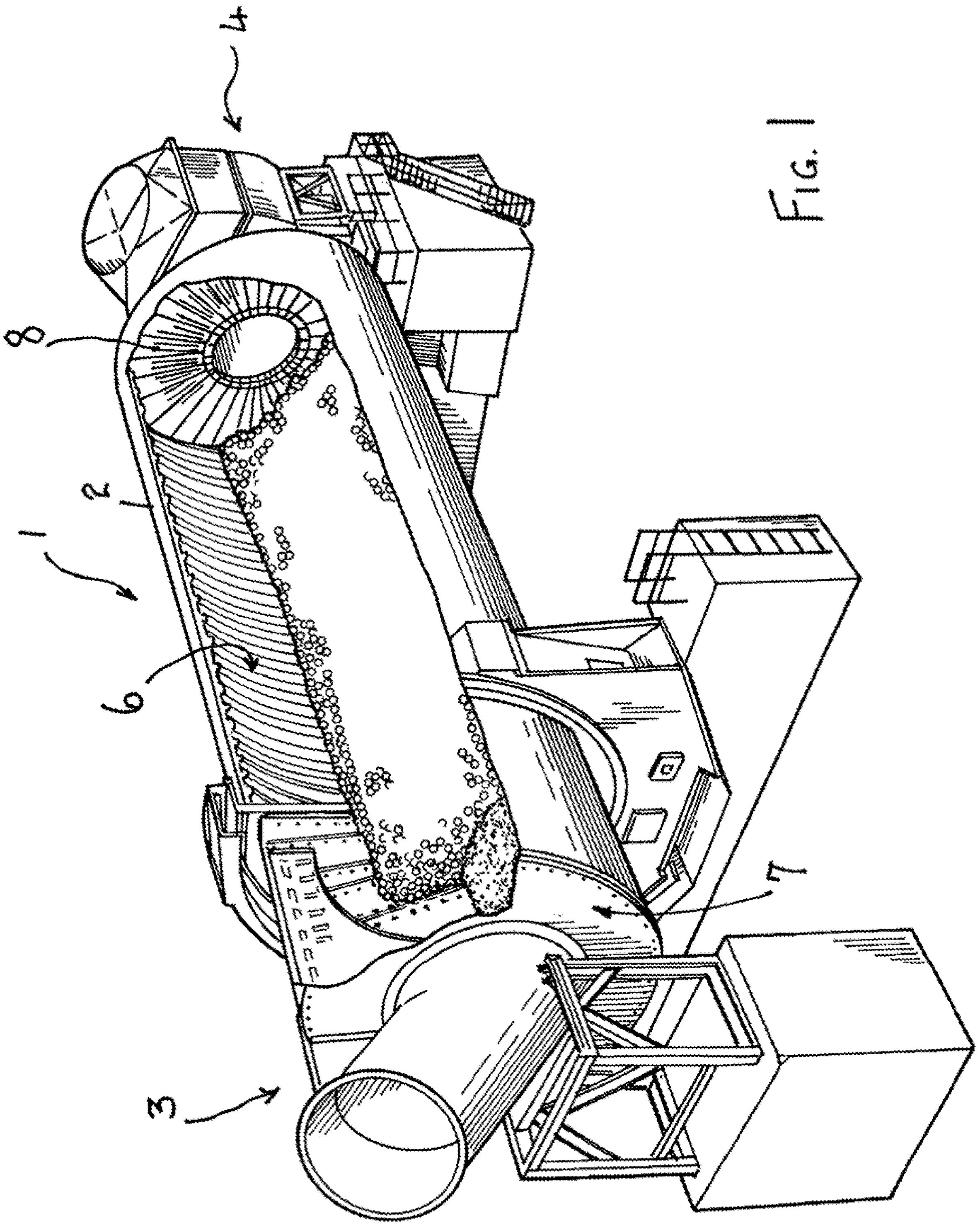
FIG. 1 is a perspective view of a ball mill to which the preferred embodiment of the present invention can be applied.

As seen in FIG. 1, a grinding mill 1 has a generally cylindrical body 2 having an inlet end 3 and an outlet and 4. The body 2 has an interior lining 6 with two frusto-conical ends 7, 8. The entire lining 6 is divided into segments which go together to make the cylindrical whole.

Figure 2:
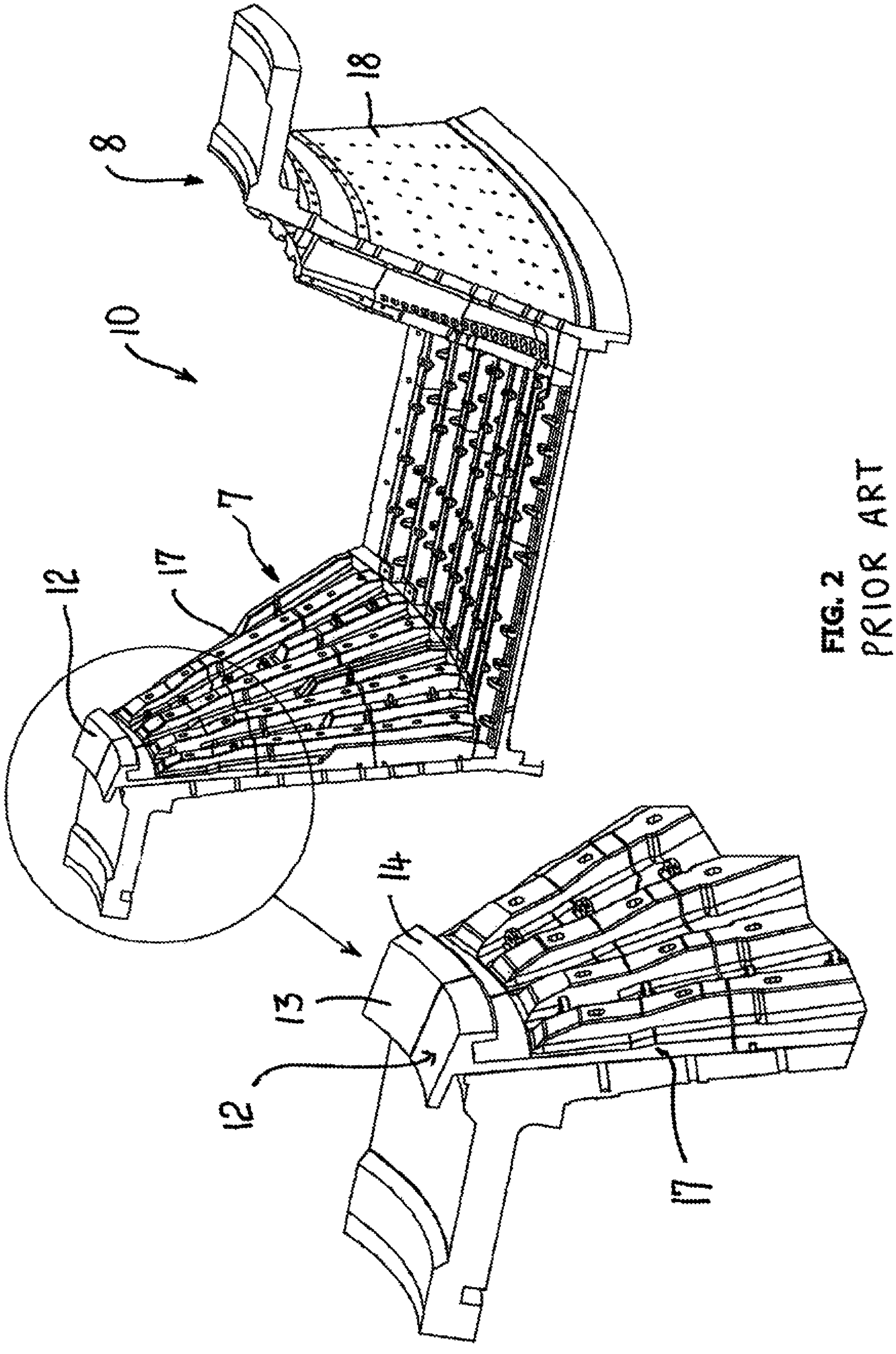
FIG. 2 PRIOR ART
FIG. 2 is a reproduction of FIG. 2A of the above-mentioned US patent.

FIG. 2 illustrates one of these prior art segments 10. It will be seen that the segment 17 of the frusto-conical inlet end 7 is different from the segment 18 of the frusto-conical outlet end 8. In particular, the inlet segment 17 includes part of an annular collar 12 formed from part of a first generally cylindrical surface 13 and part of an annular flange 14. The advantages achieved in the arrangement described in the above-mentioned US patent stem from the presence of, and shape of, the collar 12 at the inlet end 7.

Hitherto, at the outlet end 8 the slurry exiting the mill 1 carries with it some ore particles of considerable size together with some of the grinding media. These big particles and grinding media have to be separated from the remainder of the slurry and this is done, for example, by means of trommels or sieves. The big particles and grinding media and then returned to the inlet end 7 of the mill 1.

Figure 3:
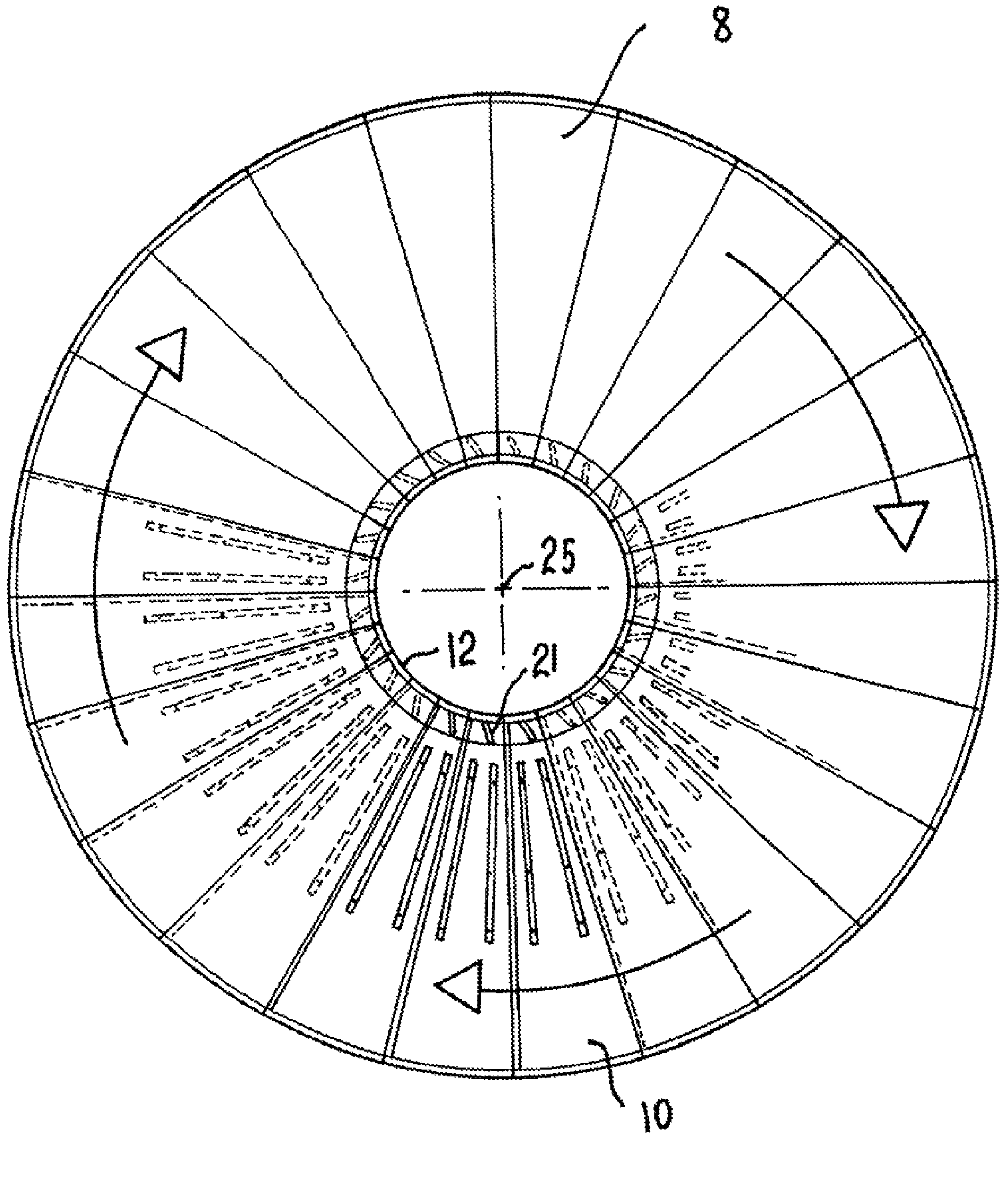
FIG. 3 is an interior elevation of the frusto-conical outlet of the mill of FIG. 1.
Figure 4:
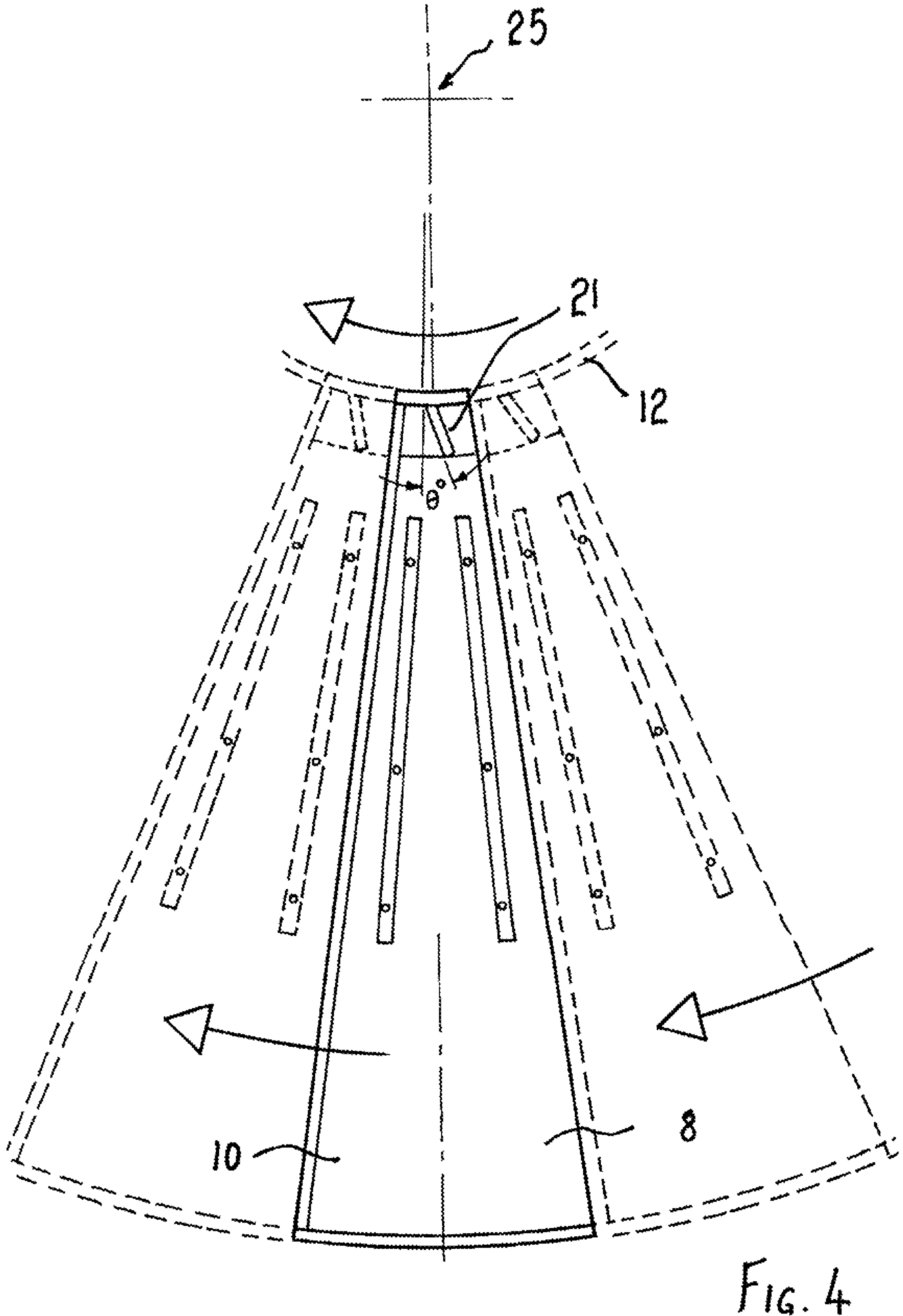
FIG. 4 is a view similar to FIG. 3 but on an enlarged scale.
Figure 5:
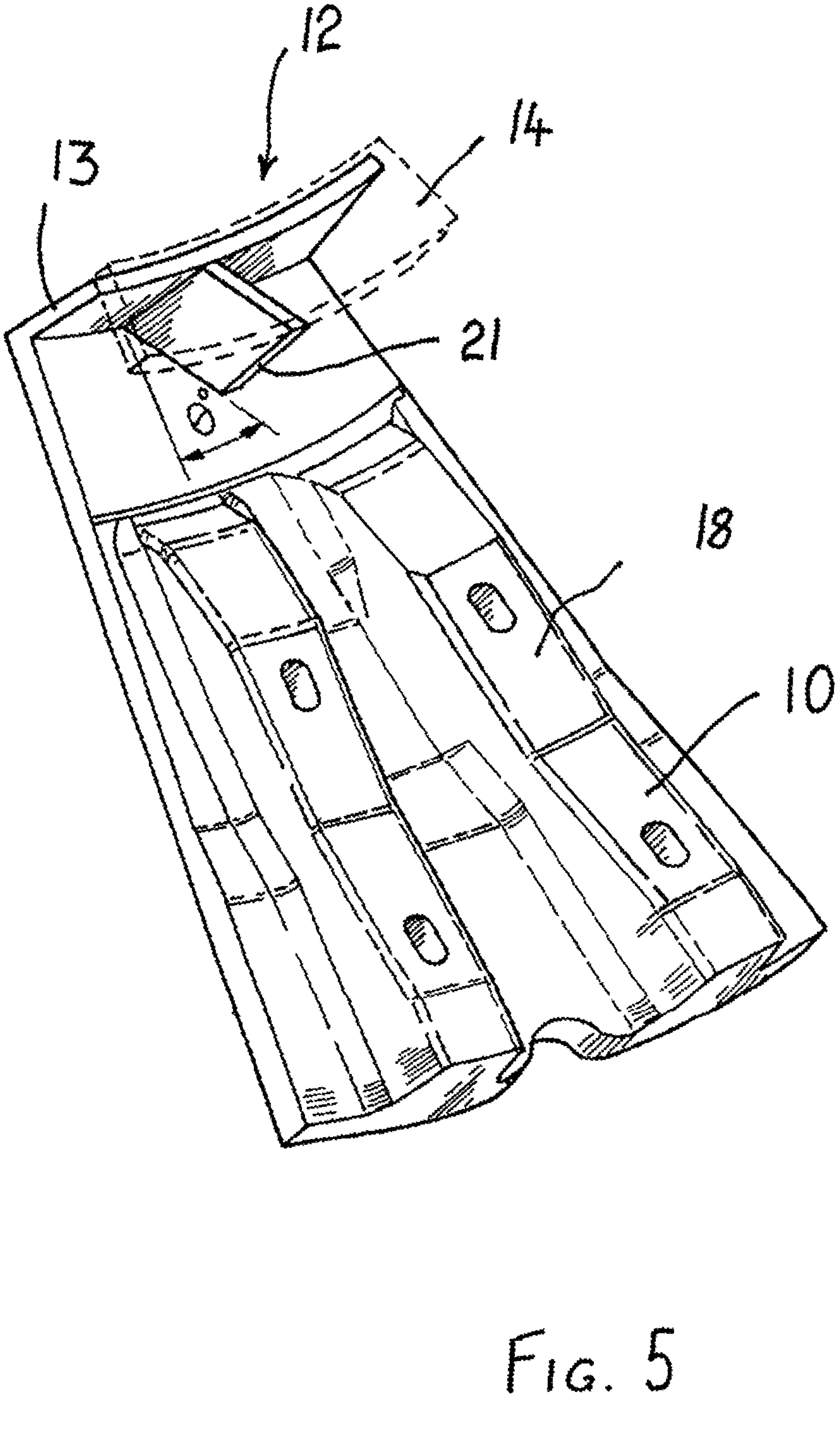
FIG. 5 is a perspective view of one of the liner segments.

Turning now to FIGS. 3-5, in accordance with the first embodiment of the present invention, these big particles and grinding media are substantially prevented from exiting the outlet end 8 by the provision of vanes 21 positioned interior of the cylindrical surface 13 and flange 14. Each vane 21 is preferably rearwardly inclined from the central axis of the mill by an angle ⊖° in the direction of rotation of the mill (as indicated by arrows in FIGS. 3 and 4). That is, as seen in FIG. 4 a vane 21 lies in a first plane making an acute angle with a second plane which is radial to the mill axis 25. The angle ⊖° can lie between zero and 45° and is preferably 22.5°.

As the slurry rises upwardly towards the outlet end 8, any big particles of ore and any grinding media rising upwardly towards the outlet end 8 can be deflected downwardly by being hit by one of the vanes 21. As a consequence, these big particles and grinding media do not exit via the outlet end 8 but are instead returned into the interior of the mill 1. By way of contrast, fine particles suspended in the slurry are able to move past the vanes 21 and out of the outlet end 8.

The inlet end 7 is preferably a mirror image of the outlet end 8 and the ends differ only in the direction of deflection of the valve 21. This is necessary to ensure that the vanes 21 at the inlet end 7 also knock or deflect the large ore particles and grinding media downwardly.

The result of this operation is that the prior art trommels, screens or magnets and slurry return path are not required.

Figure 6:
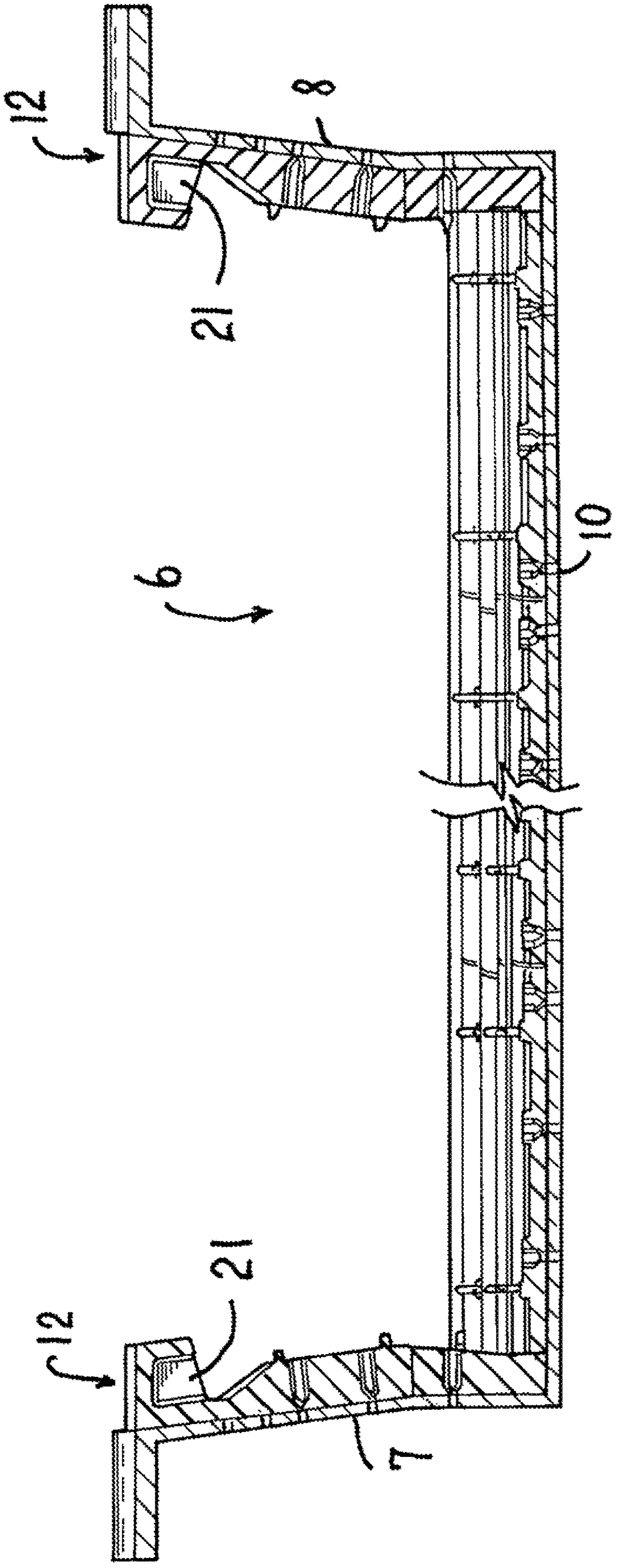
FIG. 6 is a truncated side elevation of a segment of the mill lining.

Furthermore, as seen in FIG. 6, since both the frusto-conical inlet end 7 and the frusto-conical outlet end 8 have identical collars 12, this results in a saving in the number of different inventory items required to be kept on hand at the mill site.

Figure 7:
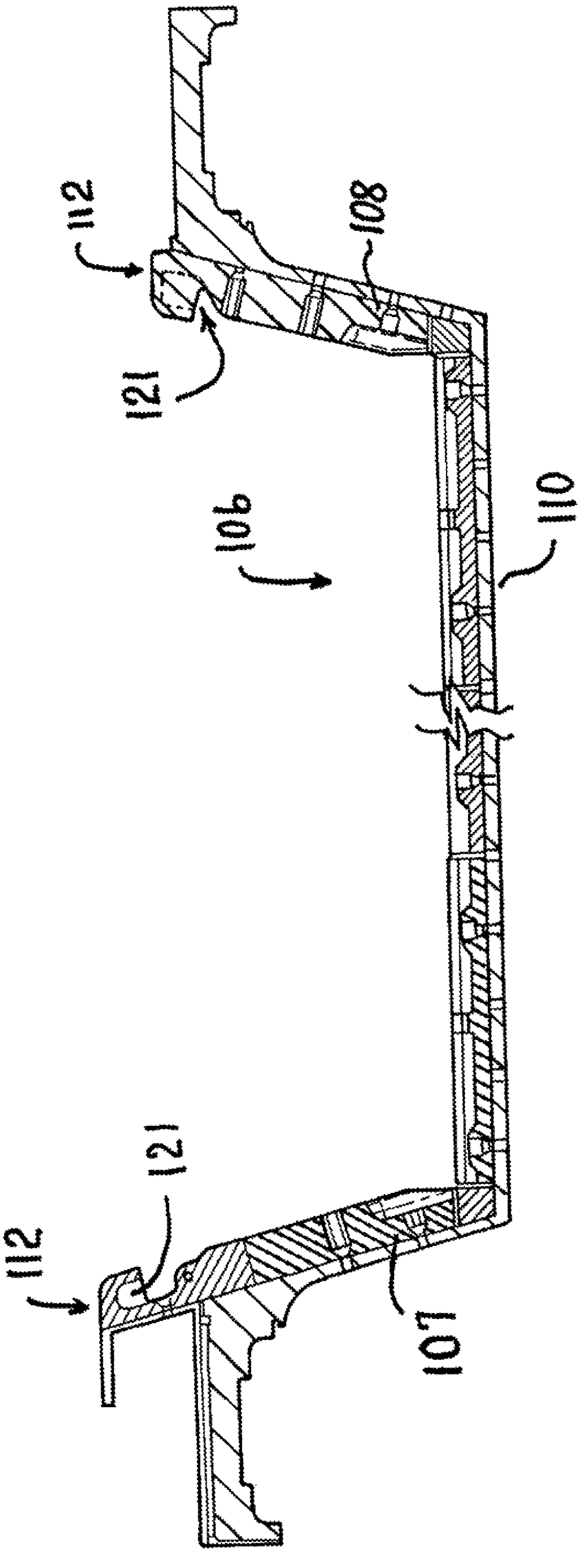
FIG. 7 is a view similar to FIG. 6 but of another embodiment.

A second embodiment is illustrated in FIG. 7 in which like items to the first embodiment have a designation number increased by 100. The vanes 121 of the second embodiment are the same as the vanes 21 of the first embodiment, however, the general mounting arrangements at the inlet end 107 and the outlet end 18 are different. That is to say, it is not necessary for the inlet end 7 and outlet end 8 to be the same as was the case in the first embodiment.

The foregoing describes only two embodiments of the present invention and modifications, obvious to those skilled in the mining arts, can be made thereto without departing from the scope of the present invention. For example, the present invention is applicable to Sag, Ag, Ball and Rod mills.

The term “comprising” (and its grammatical variations) as used herein is used in the inclusive sense of “including” or “having” and not in the exclusive sense of “consisting only of”.

The invention claimed is:

1. A liner segment for a rotary mineral ore grinding mill having a generally horizontal mill axis, and an interior having a generally cylindrical liner with a frusto-conical end constituting an exit for ground ore slurry formed in said mill,
- said liner segment comprising one of a plurality of substantially identical segments making up said liner frusto-conical end, and each of said segments including a part of a collar which protrudes inwardly into said mill interior and has a first generally cylindrical surface co-axial with said mill axis and a second flange surface forming a substantially annular flange of greater radius than said first generally cylindrical surface, surrounding an inner end of said generally cylindrical surface, and being connected thereto, and
- each of said segments having a vane located thereon extending radially outwardly of said generally first cylindrical surface and projecting into the interior of said mill, said vane impeding the exit from said mill of unground ore particles and grinding media and permitting the exit of said slurry.

2. The liner segment of claim 1, wherein said vane is substantially planar.

3. The liner segment of claim 2, wherein said vane lies substantially in a first plane making an acute angle with a second plane which is radial to said mill axis.

4. The liner segment of claim 3, wherein said acute angle is between 0° and 45°.

5. The liner segment of claim 4, wherein said acute angle is 22°.

6. A mill liner having a substantially cylindrical body and two frusto-conical ends, one of said ends being an entry end and the other of said ends being an exit end, said exit end having a plurality of liner segments including a part of a collar which protrudes inwardly into said mill interior and has a first generally cylindrical surface co-axial with said mill axis and a second flange surface forming a substantially annular flange of greater radius than said first generally cylindrical surface, surrounding an inner end of said generally cylindrical surface, and being connected thereto, and
- each of said segments having a vane located thereon extending radially outwardly of said generally first cylindrical surface and projecting into the interior of said mill, said vane impeding the exit from said mill of unground ore particles and grinding media and permitting the exit of said slurry.

7. The mill liner of claim 6, wherein said entry end is a mirror image of said exit end.

8. A method of operating a rotary mineral ore grinding mill having a horizontal mill axis, and a generally cylindrical interior with lined with a generally cylindrical liner having a substantially frusto-conical liner entry end and a substantially frusto-conical liner exit end, wherein said substantially frusto-conical liner exit end is formed from a plurality of segments, each of said segments including a part of a collar which protrudes inwardly into a mill interior and has a first generally cylindrical surface co-axial with said mill axis and a second flange surface forming a substantially annular flange of greater radius than said generally cylindrical first surface, surrounding an inner end of said generally cylindrical surface, and being connected thereto, and each said segment having a vane located thereon radially outwardly of said part first generally cylindrical surface and projecting into the interior of said mill, said vanes impeding the exit from said mill of unground ore particles and grinding media and permitting the exit of said slurry, said method comprising the step of operating said mill without any slurry return path from said exit end to said entry end.

9. The method of claim 8, wherein said vane is substantially planar.

10. The method of claim 9, wherein said vane lies in a first plane making an acute angle with a second plane which is radial to said mill axis.

11. The method of claim 10, wherein said acute angle is between 0° and 45°.

12. The method of claim 10, wherein said acute angle is 22°.

* * * * *